(12) United States Patent
Deverich

(10) Patent No.: US 6,660,921 B2
(45) Date of Patent: Dec. 9, 2003

(54) COLORALL FINGERING

(76) Inventor: Robin Kay Deverich, 2 Blessing, Irvine, CA (US) 92612

(*) Notice: Subject to any disclaimer, the term of this patent is extended or adjusted under 35 U.S.C. 154(b) by 0 days.

(21) Appl. No.: 10/102,223

(22) Filed: Mar. 19, 2002

(65) Prior Publication Data

US 2003/0000364 A1 Jan. 2, 2003

Related U.S. Application Data

(60) Provisional application No. 60/277,246, filed on Mar. 20, 2001.

(51) Int. Cl.$^7$ .............................................. G09B 15/00
(52) U.S. Cl. ................. 84/470 R; 84/477 R; 84/483.1; 84/483.2; 84/485 R
(58) Field of Search .......................... 84/470 R, 471 R, 84/477 R, 482, 483.1, 483.2, 485 R

(56) References Cited

U.S. PATENT DOCUMENTS

| | | | |
|---|---|---|---|
| 3,771,409 A | * 11/1973 | Rickey | ..................... 84/471 R |
| 3,820,434 A | 6/1974 | Roberts | |
| 3,978,756 A | 9/1976 | Feldman | |
| 5,540,132 A | 7/1996 | Hale | |
| 5,811,705 A | * 9/1998 | Glenn | ..................... 84/477 R |
| 5,920,023 A | 7/1999 | Ravagni | |
| 6,162,981 A | 12/2000 | Newcomer | |
| 6,218,603 B1 | 4/2001 | Coonce | |
| 6,288,315 B1 | 9/2001 | Bennett | |
| 6,313,385 B1 | 11/2001 | Beatty | |
| 2002/0011142 A1 | 1/2002 | Mead | |

OTHER PUBLICATIONS

Geminiani, Francesco. *The Art of Playing on the Violin*. London, 1751. [music book].

Mitchell, Albert G. *The Public School Class Method for the Violin*. 1916: p. ix. Oliver Ditson Co: Boston, [music method book].

Mitchell, Albert G. "Class Violin Teaching," *Music Supervisors National Conference Proceedings*, 1920, p. 109. [journal article].

Brown, Hullah. "The Violinda" c. 1940. Joseph Williams Limited: London. [advertising brochure].

Blair, Reva & Lyon, Laurence. *Rainbow Tones—Violin—Book 2*. 1972. Modern Music Methods: Logan, Utah. [music method book].

Hoppin, Richard H. *Medieval Music*. 1978, p. 60. W.W. Norton Co., New York. [book].

Rogers, George L. "Effect of Color–Coded Notation on Music Achievement of Elementary Instrumental Students," *Journal of Research in Music Education*. 1991, pp. 64–73, vol. 39. [journal article].

Wallace, Helen. "A Rainbow of Learning," *The Strad*, Sep. 1992, pp. 816–819. [magazine article].

Mitchell, Brenda. "Upper Midwest: A Colourful Conference in Mankato," *American String Teacher*, Autumn 1993, p. 49. [magazine article].

Szilvay, Geza & Szilvay, Csaba. "Colourstrings." [website for Colourstrings music teaching: http://www.colourstrings.co.uk/ ]Surrey, England. Accessed site Jun. 14, 2002.

Taylor, Terilyn & Milleret, Toni. "The Color Connection Series." [violin, viola & cello scales, note reading & fingering charts—website: http://www.ccseries.com/colorconnectionseries/ ]. Publication date: unknown (just found this site on the Internet). T & T Publishing, Las Vegas, Nevada. Accessed site Jun. 14, 2002.

* cited by examiner

*Primary Examiner*—Shih-Yung Hsieh
(74) *Attorney, Agent, or Firm*—Knobbe, Martens, Olson & Bear, LLP.

(57) ABSTRACT

A method for teaching stringed instrument students how to play sheet music through the use of colored fingering numbers. This method assists the user in knowing which finger to use on which string as they play instrumental music. It also indicates which position their hand should be in as they play sheet music. Numbers correspond to which finger should be used to play a particular note. Separate, distinctly identifiable colors are assigned to notes that should be played on a particular string in a particular position, and are visually displayed as colored fingering numbers that indicate which string and in which position the user should play the fingered notes on.

2 Claims, 6 Drawing Sheets

| Customize ColorAll Fingering | |
|---|---|
| 68— Select Region | Measures 1 - |
| 70— Edit Colors | G String - Select Color Green |
| 72— Edit Fingering | Insert desired number(s) |
| 74— Edit Shifts | Insert 1st Position Fingering |
| 76— Remove Fingering | Measures 1 - |
| 78— Save Changes | Measures 1 - |
| 80— Restore Default Fingering | Measures 1 - |

Customize ColorAll Fingering

| | | |
|---|---|---|
| 68 — | Select Region | Measures 1 - |
| 70 — | Edit Colors | G String - Select Color Green |
| 72 — | Edit Fingering | Insert desired number(s) |
| 74 — | Edit Shifts | Insert 1st Position Fingering |
| 76 — | Remove Fingering | Measures 1 - |
| 78 — | Save Changes | Measures 1 - |
| 80 — | Restore Default Fingering | Measures 1 - |

FIG. 6

COLORALL FINGERING

CROSS-REFERENCE TO RELATED APPLICATIONS

This application claims the benefit of the filing of U.S. Provisional Patent Application Ser. No. 60/277,246, entitled "Colorall fingering," filed on Mar. 20, 2001, and the specification thereof is incorporated herein by reference.

BACKGROUND OF THE INVENTION

This invention relates generally to music teaching systems and methods and, more particularly, to music teaching systems and methods for stringed instruments.

Beginning students of stringed musical instruments such as the violin, viola, cello and string bass face the challenge of not only mastering instrumental technique, but also of learning how to play printed music. Even if a student already knows how to read music, they also must learn which finger to use on which string, and in which hand position along the fingerboard they should place their fingers in order to produce the desired notes.

Numerous efforts have been made to assist stringed instrument players with proper finger placement on the strings. Since stringed instruments such as the violin have no frets to help the user know where to place their fingers, many methods suggest that fingerboard markings be used. Francesco Geminiani's 1751 violin method book, "The Art of Playing on the Violin," contains a visual depiction of the violin fingerboard with all of the tones and semitones marked, and includes a recommendation that the learner similarly mark their violin fingerboard. He also illustrates and describes the seven hand positions used in playing the violin, and includes fingering numbers placed over some musical notes to indicate when the user should shift from one hand position to another.

In a 1920 article entitled "Class Violin Teaching," Albert G. Mitchell describes how he developed and printed a violin fingerboard chart to paste on the fingerboard of student violins to assist his students with finger placement and intonation. Mitchell's method book, the 1918 edition of "The Public School Class Method for the Violin," shows an illustration of an adhesive fingerboard chart along with the instructions that copies of these colored charts may be ordered and placed on the user's fingerboard. Mitchell's 1918 method book also contains black fingering numbers selectively placed above the printed music to assist the user in knowing which finger to use when playing music. Other fingerboard guides include Hullah Brown's colored spots which he adhered to the fingerboard of an instrument he called the violinda, a form of a violin he designed for young children in Britain in the 1930s.

Many patents have been issued for devices that have been developed to assist the user with proper finger placement on the fingerboard. Representative patents showing aids of this type are U.S. Pat. No. 2002/0,011,142, to Mead, "Method and apparatus for teaching playing of stringed instrument," a chromatic fingerboard map that shows the finger location of notes; U.S. Pat. No. 6,218,603, to Coonce, "Note locator for stringed instruments," an adhesive fingerboard device with colored indicators to assist the user in correct finger placement on the strings; U.S. Pat. No. 5,920,023, to Ravagni, another adhesive fingerboard system that aids students in finger positioning, and electronic fingerboard sensor systems such as U.S. Pat. No. 6,162,981, to Newcomer, "Finger placement sensor for stringed instruments." All of these fingerboard aids attempt to assist the user in fingering placement, and all are variations of the same concept: where to place the fingers, not how to increase the user's ability to finger and read regular sheet music.

Some fingerboard placement devices attempt to assist the user with fingering and note reading skills. U.S. Pat. No. 3,978,756, to Feldman, entitled "Guitar Instruction System," places colored indicia comprising the note names on the fingerboard, and uses colored noteheads on sheet music that is attached to the guitar fingerboard with a music sheet holder. The sheet music is written backwards, and requires the user to read it using a mirror. Such a system depends upon external devices that are bulky and cumbersome, and distracts the user from the concentration needed to read regular sheet music and properly play their instrument.

Feldman's use of color to assist with note reading skills is not new. Throughout the ages, color has been used to help students learn musical notation. During the Medieval Era, before the four-line staff was standardized, different colored ink was frequently used to draw different lines, such as red for f and yellow or green for c'. In a 1991 article entitled "Effect of Color-Coded Notation on Music Achievement of Elementary Instrumental Students," George Rogers describes numerous research studies which found that the use of color in non-music instructional materials resulted in increased student performance. However, when Rogers conducted a study using color-coded notation with music students, his experiment did not result in higher student achievement. This is likely due to the manner in which he designed his study. Rogers assigned a different color to each of the 12 chromatic tones, an approach that utilized too many colors to effectively assist the music students in playing and learning music more rapidly than those students using standard notation.

A simplified form of colored notation can be found in the 1972 publication, "Rainbow Tones, Book 2" for Violin. This approach uses four colors that correspond to the four strings of the violin. Instead of musical staff lines, thick blocks of colors are used with the letter name of each note printed in black within the colored blocks to indicate what string the user should use to play the notes. This approach also recommends that the user place colored adhesive sticker dots on their fingerboard to assist in correct finger placement. The use of colored blocks, letters and other deviations of standard notation require the user to learn yet another confusing system of how to play music.

Another music instruction system using colored notation is described in two articles entitled "A Rainbow of Learning," and "Upper Midwest: A Colourful Conference in Mankato." This system, the Colourstrings method, appears to be designed for young children, and the music books use graphics such as a small bird for the E string, a mommy for the A string, the D string as a daddy, and the G string as a teddy bear. Four specified colors are used which correspond to the instruments' four strings, and a progression of colored staves, noteheads and fingering is used with the first violin book using notes on a single, colored stave, in the second book, colored noteheads appear on a five line stave, and by the end of the second book, colored fingering is used with regular notation. A description of the cello book indicates that shifts are illustrated by such notation as: an orange line with a black note indicates the note is in the first position on the D string; an orange note on a black line indicates a note that is in fourth position on the same string, and this same note on a blue line would be played in first position on the A string. Although this method may be a useful and entertaining way to teach young pupils how to read music, such an overwhelming system of alternating colored lines, colored noteheads and black noteheads to indicate what fingers to use, on particular strings, in specific hand positions, could be confusing for students who already know how to read music and simply want fingering assistance in order to quickly play sheet music. Again, too many teaching tools can overload the learner and cause them to become dependent on an artificial system of musical symbols and designs rather than help the user to learn how to read and finger actual musical notation.

U.S. Pat. No. 6,288,315 to Bennett issued Sep. 11, 2001, entitled "Method and apparatus for musical training," describes a template designed to identify desired combinations of musical notes. He devised a simplified form of colored notation to assist the user in playing stringed and keyboard instruments. His method not only assigns a different color to each diatonic note of the scale, but also employs a confusing assignment of combinations of colors to indicate sharps and flats. His apparatus includes different templates for chords, scales and other different sets of notes, and his effort to simplify notation for the user, instead, adds complex confusion.

Additional patents devised to teach musical notation include U.S. Pat. No. 5,540,132 to Hale issued May 2, 2000, entitled "Method and apparatus for teaching musical notation to young children." This method and apparatus is designed for young children. Each note of the scale is associated with a distinctly identifiable color, which is in turn associated with an object which naturally occurs in this color. Each object is associated with a cartoon character which prominently incorporates an image of the object. Each character is endowed with a distinctly identifiable personality characteristic to enable the child to utilize the cartoon character in an educational activity. Although possibly useful for young children, such a system requires the user to learn new systems and symbols, and would not be practical for helping stringed players quickly finger and play written music.

OBJECTS AND ADVANTAGES

It is therefore an object of the present invention to provide a system of colored fingering for sheet music that overcomes the drawbacks and limitations of the prior art. Several objects and advantages are:

(a) to provide a system of colored fingering for sheet music that allows the user to play directly off sheet music without requiring the assistance of a teacher to teach them which finger they should use for each note.

(b) to provide a system of colored fingering for sheet music that allows the user to play directly off sheet music without requiring the assistance of a teacher to teach them which string they should place their fingers on as they play each note.

(c) to provide a method for beginning students to know which position their hand should be in as they finger and play each note of the printed sheet music.

More than young, beginning violinists will benefit from this method. Many adult violin students have a desire to quickly begin playing music, without having to go through the laborious process of learning or relearning how to properly finger their music on the correct string and using the appropriate hand position. Although some adult violin students learned how to play the violin when they were children, they have forgotten the correct fingering, hand positions and the correct string to use when reading sheet music. This system will not only permit former students of the violin to quickly begin playing music, but it also will refresh their memory of the proper way to finger and play their instrument. Through this system's customizing features, users can change and add their own fingering as well as gradually eliminate fingering from selected regions of the music, thus reducing their dependence upon fingering assistance and increasing their ability to play a musical instrument on their own.

BRIEF SUMMARY OF THE INVENTION

This invention relates to a colored fingering method for beginning string players, and in particular, to a system which eliminates dependence on knowing which finger, on which string, and in which hand position students should use when playing sheet music.

BRIEF DESCRIPTION OF THE SEVERAL VIEWS OF THE DRAWINGS

These and other advantages of the present invention will become more readily apparent upon reading the following detailed description and upon reference to the drawings, in which:

FIG. 6 shows a drop-down menu customizing toolbox.

Figure 1:
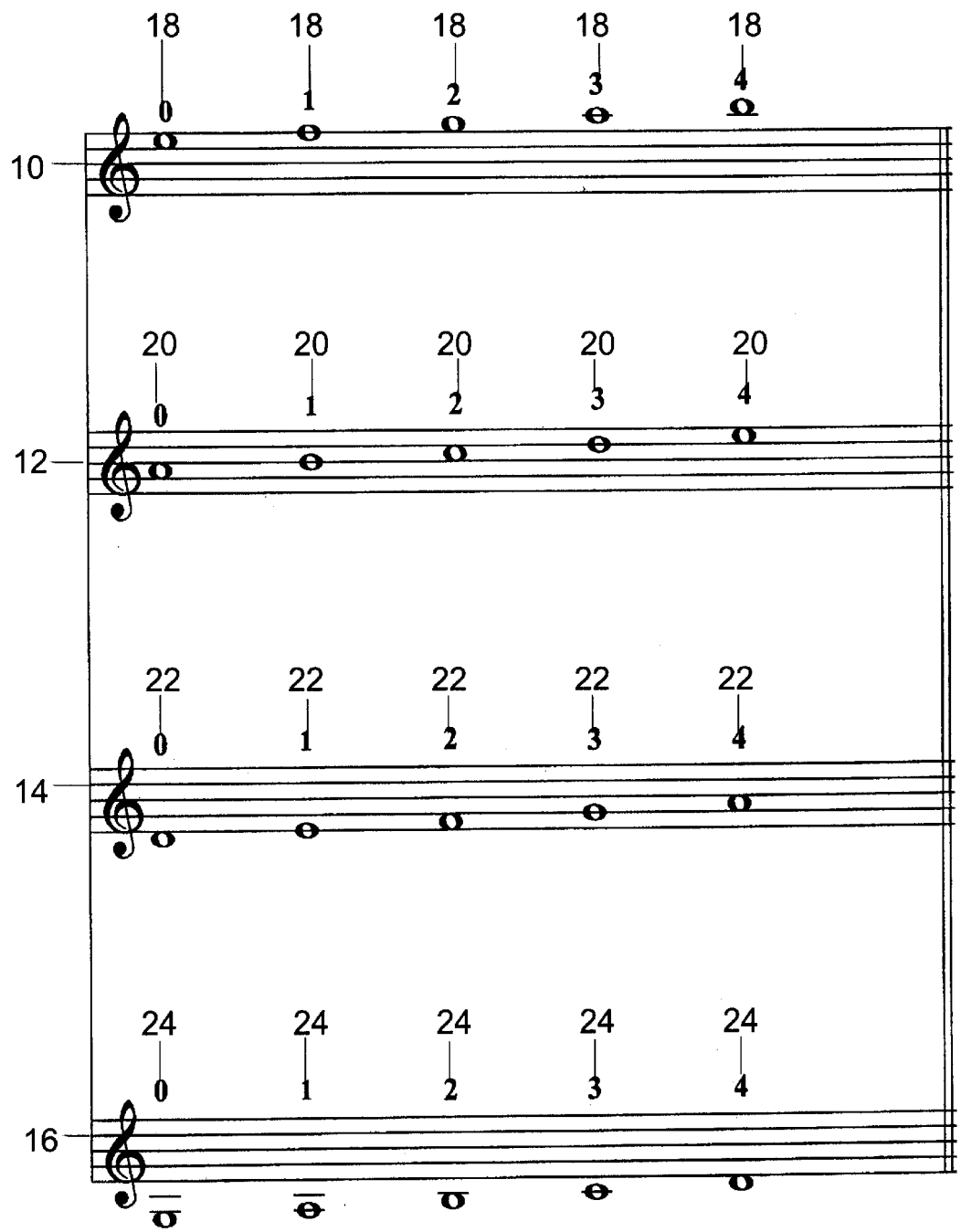
FIG. 1 shows a partial violin fingering chart of notes in the first hand position.

| Reference Numerals in Drawings | |
|---|---|
| 10 E string staff | 12 A string staff |
| 14 D string staff | 16 G string staff |
| 18 purple fingering numbers | 20 green fingering numbers |
| 22 gold fingering numbers | 24 blue fingering numbers |
| 26 $1^{st}$ position fingering numbers | 28 $2^{nd}$ position fingering numbers |
| 30 $3^{rd}$ position fingering numbers | 32 $4^{th}$ position fingering numbers |
| 34 $5^{th}$ position fingering numbers | 36 $6^{th}$ position fingering numbers |
| 38 $7^{th}$ position fingering numbers | 40 $3^{rd}$ position notes on E string |
| 42 $3^{rd}$ position notes on A string | 44 $3^{rd}$ position notes on D string |
| 46 $3^{rd}$ position notes on G string | 48 light purple fingering numbers |
| 50 light green fingering numbers | 52 light gold fingering numbers |
| 54 light blue fingering numbers | 56 light blue shifting dash |
| 58 musical excerpt line one | 60 musical excerpt line two |
| 62 light green shifting dash | 64 musical excerpt line three |
| 66 green shifting dash | 68 select region to customize |
| 70 edit colors | 72 edit fingering |
| 74 edit shifts | 76 remove fingering |
| 78 save changes | 80 restore defaults |

DETAILED DESCRIPTION OF THE INVENTION

While reference will be made to the violin, it will be understood that the present invention is equally useful for instruction with other instruments including but not limited to the viola, cello and stringed bass. The present invention includes several different aspects which can be utilized separately or in any desired combination. These different aspects are described as follows.

A preferred embodiment of a partial violin fingering chart of notes in the first hand position is illustrated in FIG. 1.

Referring to FIG. 1, there is shown four staffs with musical notation and fingering numbers placed directly above each note. The top staff 10 depicts notes and fingering numbers for the E string; the second staff 12 depicts notes and fingering numbers for the A string; the third staff 14 depicts notes and fingering numbers for the D string, and the fourth staff 16 depicts notes and fingering numbers for the G string.

According to the present invention, each string is assigned a different note color. In the preferred embodiment, the color scheme assigned to notes in the first hand position is as shown in Table 1 below. Referring again to FIG. 1, the top staff 10, displays notes on the violin E string, and each of the colored fingering numbers over these notes are colored purple 18 to indicate these notes are in $1^{st}$ position on the E string. The second staff 12, displays notes on the violin A string, and each of the colored fingering numbers over these notes are colored green 20 to indicate these notes are in $1^{st}$ position on the A string. The third staff 14, features notes on the violin D string, and each of the colored fingering numbers over these notes are colored gold 22 to indicate these notes are in $1^{st}$ position on the D string. The fourth staff 16, uses notes on the violin G string, and each of the colored fingering numbers over these notes are colored blue 24 to show that these notes are in $1^{st}$ position on the G string.

TABLE 1

| STRING | HAND POSITION | COLOR |
| --- | --- | --- |
| E | $1^{ST}$ | PURPLE |
| A | $1^{ST}$ | GREEN |
| D | $1^{ST}$ | GOLD |
| G | $1^{ST}$ | BLUE |
| C | $1^{ST}$ | RED |

It should be noted that Table 1 shows that red is the fingering color for the C string, a string that the viola and cello use, not the violin. Although FIG. 1 does not illustrate colored fingering for the C string, the same system of colored fingering applies to the cello and viola as well. As a point of reference, it should also be noted that any series of easily distinguishable colors could be used in place of or in addition to the preceding colors.

The present invention also utilizes standard fingering with numbers placed over notes to indicate which finger should be used to play a particular note. Table 2 below depicts what these fingering numbers represent. When the number 0 is placed over a written note, it represents an open string and no finger is used. When the number 1 is placed over a note, it indicates the user should use a first finger to play that note. When the number 2 is placed over a note, it reveals the user should use a second finger to play the note. When the number 3 is placed over a note, it reveals the user should use a third finger to play the note. When the number 4 is placed over a note, it indicates the user should use a fourth finger to play the note. FIG. 1 thus depicts fingering numbers in a particular color to show the user on which string, with which finger, and in which hand position they should use to play the notes on.

TABLE 2

| NUMBER | FINGER |
| --- | --- |
| 0 | OPEN STRING |
| 1 | $1^{ST}$ FINGER |
| 2 | $2^{ND}$ FINGER |

TABLE 2-continued

| NUMBER | FINGER |
| --- | --- |
| 3 | $3^{RD}$ FINGER |
| 4 | $4^{TH}$ FINGER |

Figure 2A:
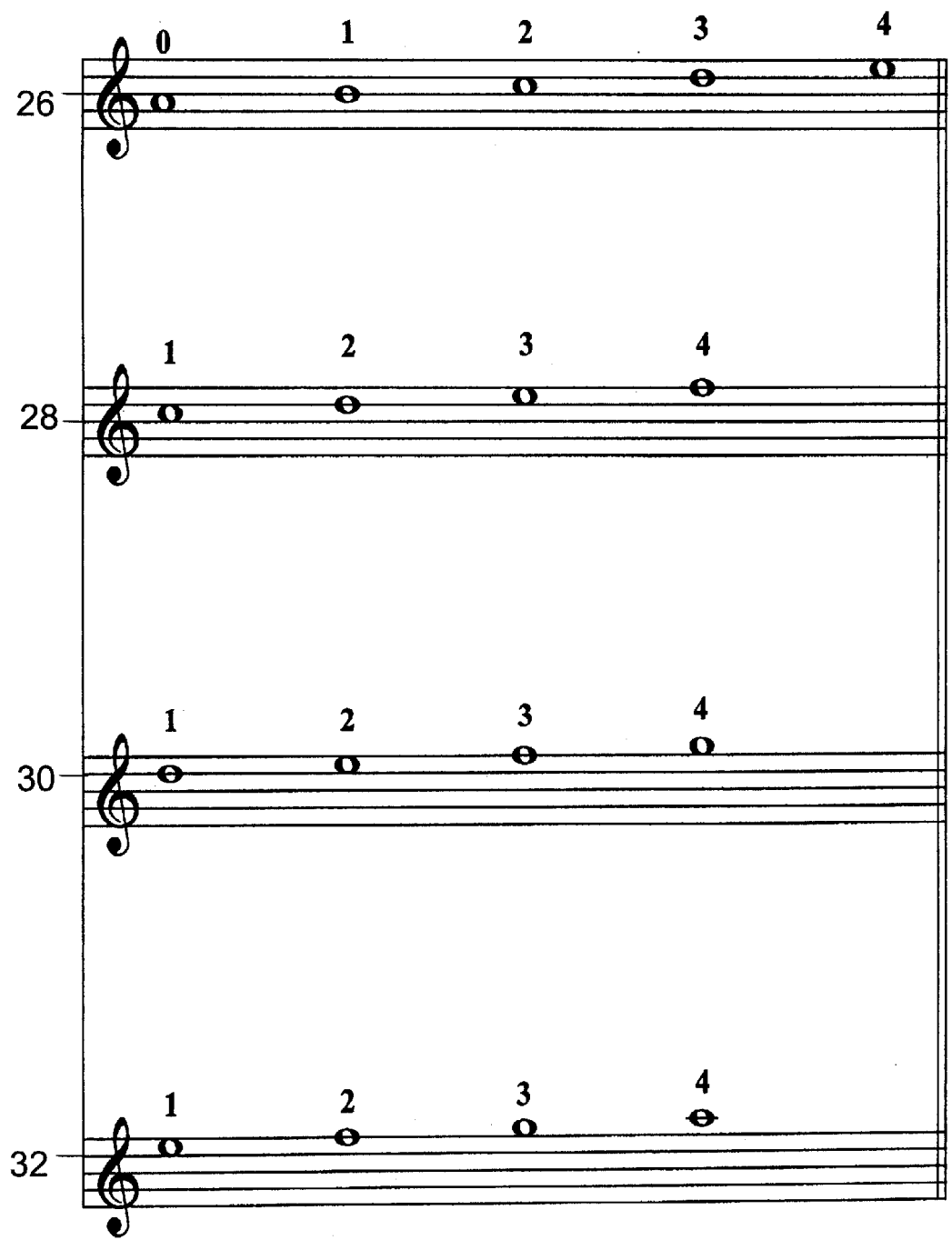
FIGS. 2A to 2B show a partial violin scale on the A string with fingering numbers for all seven hand positions.

FIG. 2A is a view or a partial violin scale on the A string to illustrate how fingering numbers change when the user shifts their hand position. All of the notes and fingers in FIG. 2A require the user to remain on the A string. The first four notes of this example in staff 26 have fingering numbers that require the user to place their hand in $1^{st}$ position. The next group of notes in staff 28 the user to shift their hand to $2^{nd}$ position. The next group of notes in staff 30 indicate fingering numbers in the $3^{rd}$ position. The next group of notes in staff 32 reveal fingering numbers in the $4^{th}$ position.

Figure 2B:
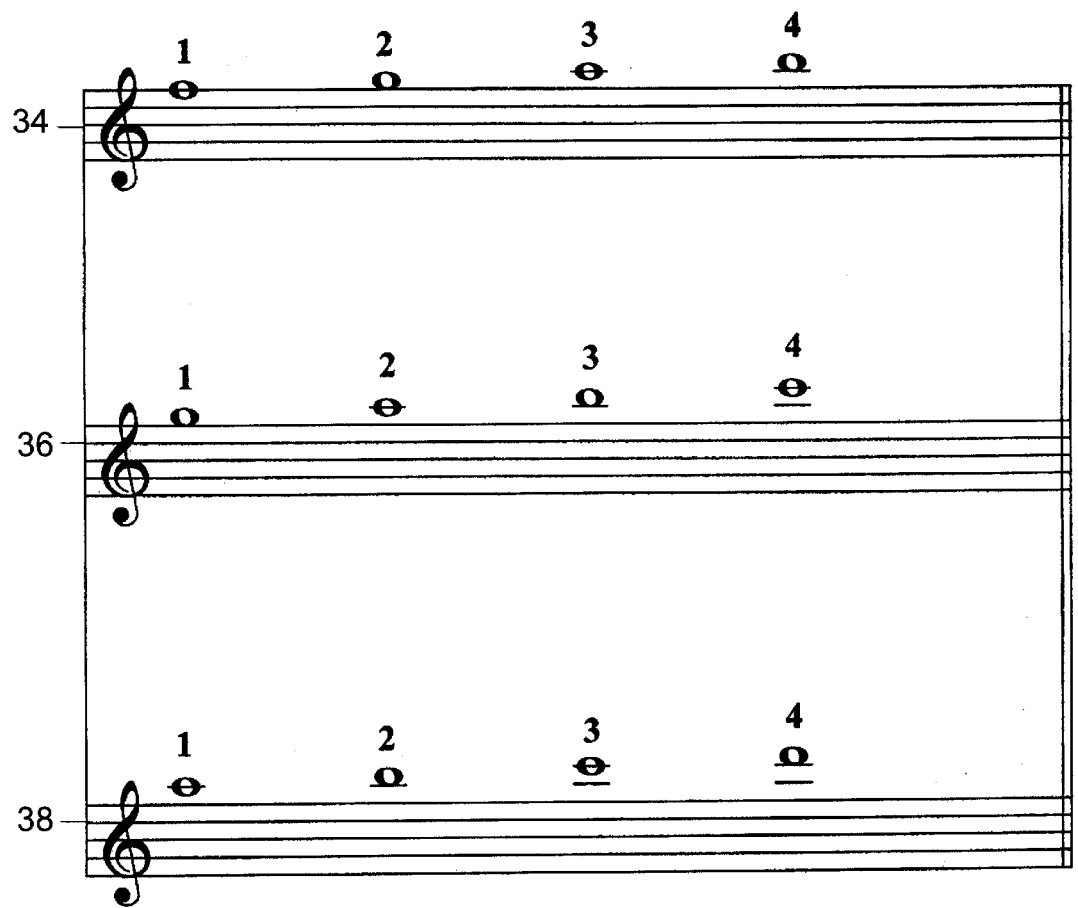

FIG. 2B is continuation of a view of a partial violin scale on the A string to illustrate how fingering numbers change when the user shifts their hand position. The first four notes of staff 34 have fingering numbers that require the user to place their hand in the $5^{th}$ position; the next group of notes in staff 36 indicate fingering numbers in the $6^{th}$ position, and the last group of notes in staff 38 reveals fingering numbers in the $7^{th}$ position.

It should be noted that the purpose of shifting the hand from one position to another, is to extend the range of the instrument. If the user's hand always remained in $1^{st}$ position, towards the scroll of the instrument, the fingers would not be able to reach higher notes on the upper portion of the strings. As a note of reference, there are seven basic hand positions in stringed instruments: $1^{st}$ position, $2^{nd}$ position, $3^{rd}$ position, $4^{th}$ position, $5^{th}$ position, $6^{th}$ position and $7^{th}$ position. A half position is sometimes used prior to $1^{st}$ position, and the cello has one additional position after $7^{th}$ position: the thumb position.

Figure 3:
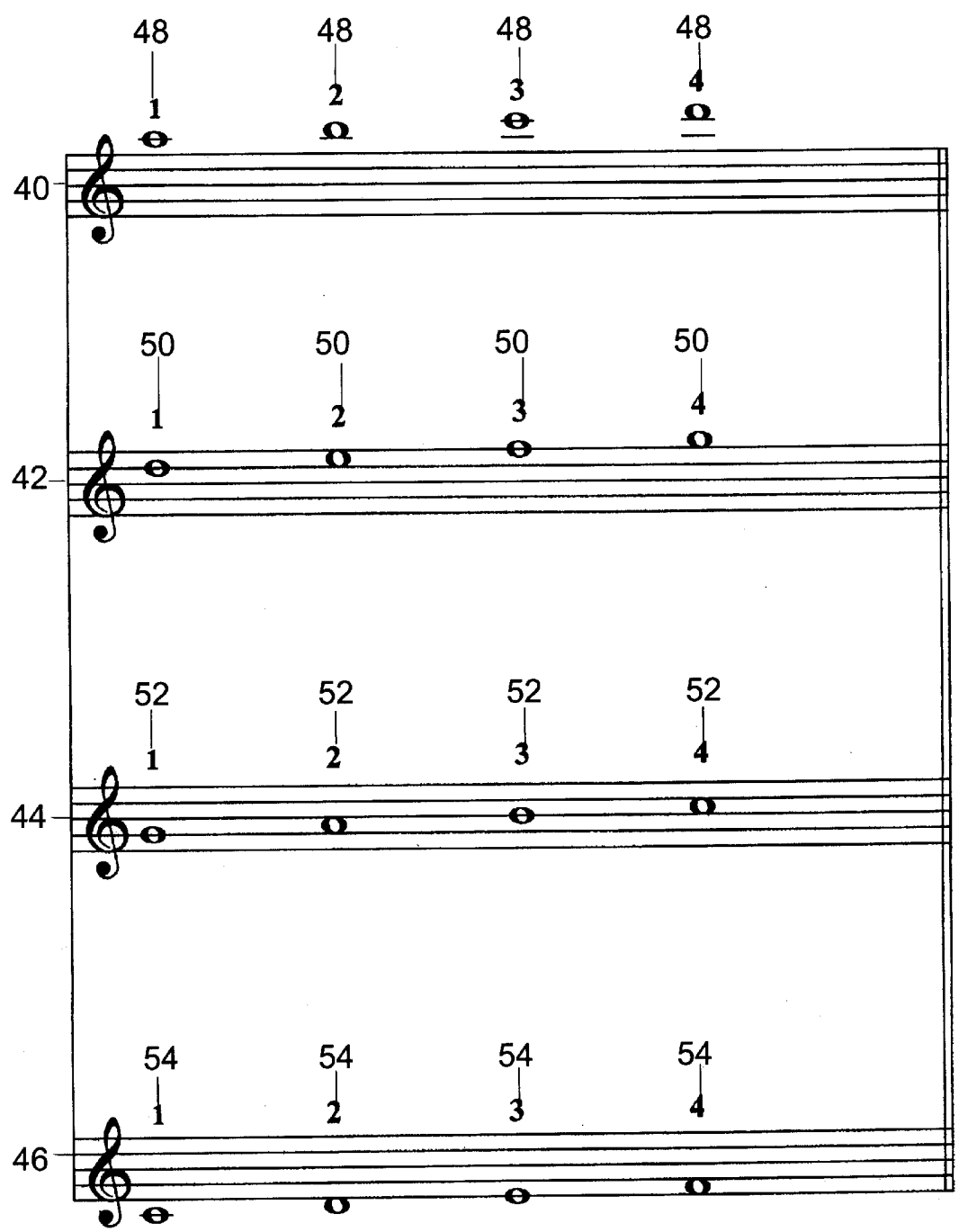
FIG. 3 reveals a partial violin fingering chart in $3^{rd}$ position.

FIG. 3 reveals a preferred embodiment of a partial violin fingering chart with notes requiring the user's hand to be placed in $3^{rd}$ position. As Table 3 below indicates, a specific, assigned variation in the brightness, saturation and/or hue of the string colors indicates the hand position no longer is in $1^{st}$ position, but has shifted to $3^{rd}$ position.

TABLE 3

| STRING | HAND POSITION | COLOR |
| --- | --- | --- |
| E | $3^{rd}$ | LIGHT PURPLE |
| A | $3^{rd}$ | LIGHT GREEN |
| D | $3^{rd}$ | LIGHT GOLD |
| G | $3^{rd}$ | LIGHT BLUE |
| C | $3^{rd}$ | LIGHT RED |

Referring again to FIG. 3, in the top staff 40, each of the colored fingering numbers over notes on the violin E string with the hand position in $3^{rd}$ position are colored light purple 48. In the second staff 42, each of the colored fingering numbers over notes on the violin A string with the hand position in $3^{rd}$ position, are colored light green 50. In the third staff 44, each of the colored fingering numbers over notes on the violin D string with the hand position in $3^{rd}$ position, are colored light gold 52. In the fourth staff 46, each of the colored fingering numbers over notes on the violin G string with the hand position in $3^{rd}$ position, are colored light blue 54.

It should be noted that although for the purpose of this illustration, the terms "light red," "light blue," "light gold,"

"light green," and "light purple" are used to indicate a shift to the 3$^{rd}$ position, the same result could be achieved through other assigned variations in the brightness, saturation and/or hue of related colors for each string, particularly in the labeling and display of such variations.

For example, if colored fingering numbers to indicate "play in the 1$^{st}$ hand position on the G string" were assigned the color blue, a possible interpretation of this color for Internet viewing could be the 216-Webmaster's Palette definition of "OO33CC-Dark Blue-Azure." Using this same color model, colored fingering numbers to indicate a shift of hand position to "play in the 3$^{rd}$ hand position on the G string," assigned the color light blue, a possible interpretation of this color for Internet viewing could be the 216-Webmaster's Palette definition of "3366FF Light Blue-Azure."

To reproduce these same colors on a color printer, however, could require an entirely different set of color definitions. Due to the complex nature of color theory, color models, the plethora of color labeling methods, and the varied display capabilities of printers and electronic devices, an unnecessarily lengthy discussion of the endless color combinations and varied methods to label color for each of the seven hand positions will not be provided here. Any series of easily distinguishable ways to vary the assigned colors of the strings could be used in place of or in addition to the colors listed in Table 3, and specific assigned variations of easily distinguishable colors can be made for each of the hand positions used to play stringed instruments.

Figure 4:
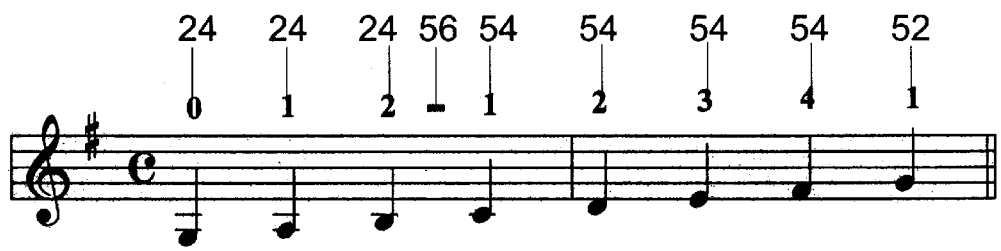
FIG. 4 shows a partial G string scale with a shift from $1^{st}$ to $3^{rd}$ position.

FIG. 4 reveals a partial violin scale on the G string, with the colored fingering directing the user to shift from the 1$^{st}$ position to the 3$^{rd}$ position. The first three notes of FIG. 4 are in 1$^{st}$ position, as indicated by colored fingering numbers that are blue 24. The second three notes of FIG. 4 are in the 3$^{rd}$ position on the G string, as indicated by colored fingering numbers that are light blue 54, and the colored fingering for the last note of this line is light gold 52, indicating the finger should be in 3$^{rd}$ position on the D string. The light blue dash 56, reveals that a shift of position is about to take place. This dash is found between the first three notes in 1$^{st}$ position and the second three notes in 3$^{rd}$ position, and the color of the dash 56, a light blue, prepares the user to know that a shift to the 3$^{rd}$ position on the G string will come next. Colored dashes are used indicate when shifts are about to take place, and the specific variation in brightness, saturation and/or hue of the color used by the dash indicates which hand position and on which string the user should prepare to shift in order to play the next printed note.

Figure 5:
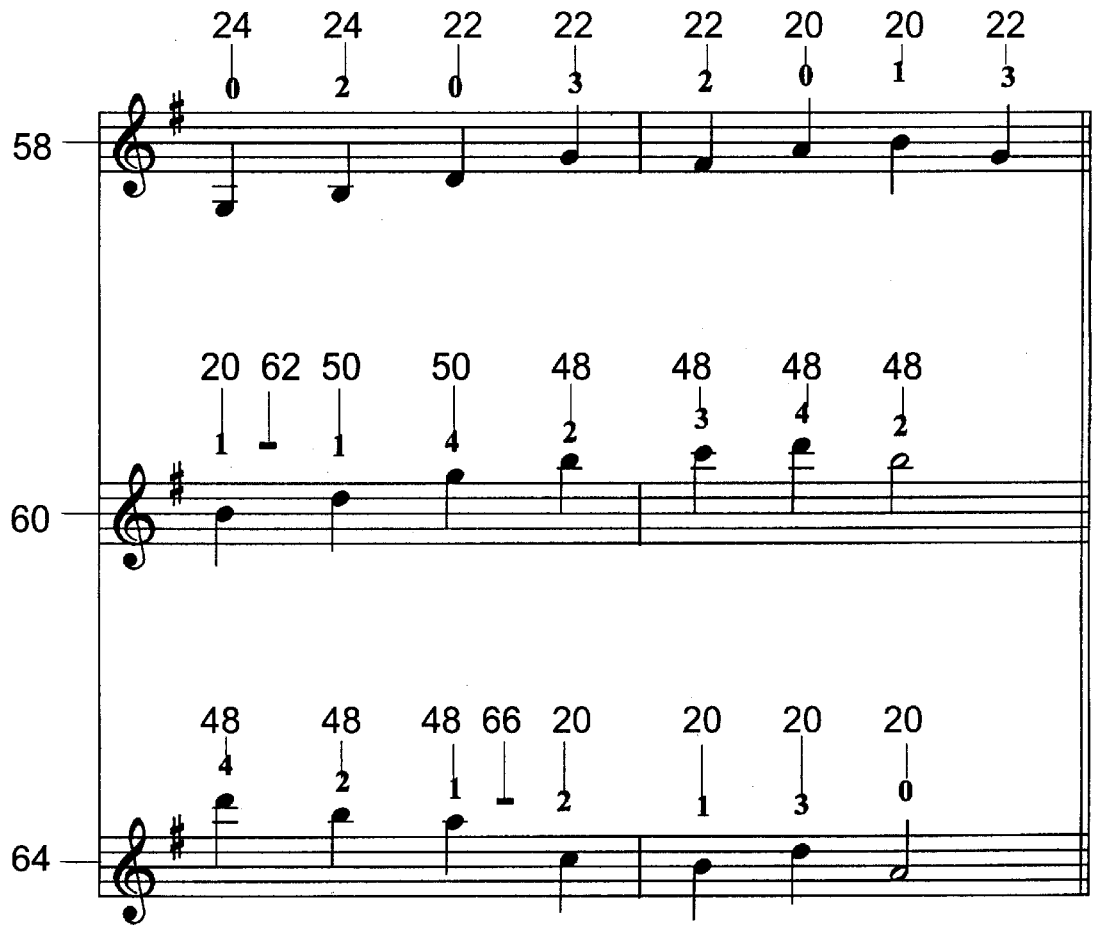
FIG. 5 shows an excerpt of violin music with colored fingering numbers.

FIG. 5 reveals an excerpt of violin music that shows the use of colored fingering numbers over the notes to indicate to the user which finger should be used on a particular string with the hand in a particular hand position as they play instrumental music. The first line of the music 58 begins with fingering that shows the music begins on the open G string, and the colored fingering for the first two notes of this line is blue 24 to indicate these notes are in the 1$^{st}$ position. The fingering for the next three notes is colored gold 22 to indicate these notes should be played on the D string in 1$^{st}$ position. The fingering of the next two notes is colored green 20 to indicate these notes should be played on the A string in 1$^{st}$ position. The fingering for the final note 22 of this line of music is colored gold to indicate this 3$^{rd}$ finger should be played on the D string.

The second line 60 of FIG. 5 shows the fingering for the first note is colored green 20, indicating this 1$^{st}$ finger should be played on the A string in 1$^{st}$ position. Next, a light green shifting dash 62 reveals the user should prepare to shift into the 3$^{rd}$ position on the A string for the next note. The fingering for the second and third notes of this line are colored light green 50, showing these notes should be played on the A string in the 3$^{rd}$ position. The fingering for the last four notes of this line of music 60 are colored light purple 48, revealing these notes should be played on the E string in 3$^{rd}$ position.

The third line 64 of FIG. 5 reveals the fingering for the first three notes is colored light purple 48, indicating these notes are to be played on the E string in 3$^{rd}$ position. A green shifting dash 66 indicates the user should prepare to shift into the 1$^{st}$ position on the A string for the next note. The fingering for the final four notes of this musical excerpt are colored green 20 indicating the user should play these notes on the A string in 1$^{st}$ position.

FIG. 6 is a view of a drop-down menu customizing toolbox that enables the user to:

(a) select the region to make changes, 68 and;
(b) edit the default colors and replace or alter them with colors of their own choosing, 70 and;
(c) edit the fingering and change or replace fingering numbers with fingering numbers of their own choosing, 72 and;
(c) edit the shifts and change or replace default shifting of hand positions and corresponding fingering with shifts and fingering of their own choosing, 74 and;
(d) eliminate the use of colored fingering in selected regions or throughout the music, 76 and;
(e) save changes 78 or restore default fingering and colors 80.

Through these customizing features, users will be able to improve their ability to learn how to finger and play music without assistance. All variations of customizing choices will not be delineated here due to the endless variations and combinations possible.

What is claimed is:

1. A method for instructing a student to play music on a stringed instrument on the correct string, with the correct finger, and in the correct hand position, the method comprising:

(a) providing sheet music having a musical staff and musical notes with colored fingering numbers placed above the musical notes;

(b) assigning a unique color to each string of the stringed instrument, (c) using the colored fingering numbers to indicate which string the student should place a finger on, (d) using the colored fingering numbers to indicate which finger should be used, (e) for each string of the stringed instrument, assigning a unique variation of the color assigned to the string to each hand position on a fingerboard of the stringed instrument, wherein each unique variation comprises a particular brightness, saturation and/or hue of the color assigned to the string;

(f) using the colored fingering numbers to indicate the hand position on the fingerboard in which the student's hand should be located, and;

(g) using a colored dash to indicate that a shift to a new hand position is about to take place, wherein the color of the dash indicates the hand position and the string to which the student should prepare to shift in order to play the next printed note.

2. A process for customizing colored fingering for playing music, comprising:
   (a) selecting a region of the music in which a default colored fingering is to be customized;
   (b) editing one or more colors of the default colored fingering in the selected region;
   (c) editing one or more fingering numbers of the default colored fingering in the selected region; and
   (d) editing one or more hand position shifts of the default colored fingering in the selected region.

* * * * *